(12) United States Patent
Vincent

(10) Patent No.: US 8,813,527 B2
(45) Date of Patent: Aug. 26, 2014

(54) PNEUMATIC VARIABLE DAMPING DEVICE FOR WASHING MACHINES

(75) Inventor: Richard Allen Vincent, Louisville, KY (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 12/949,220

(22) Filed: Nov. 18, 2010

(65) Prior Publication Data

US 2012/0125054 A1  May 24, 2012

(51) Int. Cl.
*D06F 37/20* (2006.01)
*D06F 37/22* (2006.01)
*F16F 9/02* (2006.01)

(52) U.S. Cl.
CPC .............. *F16F 9/0218* (2013.01); *D06F 37/20* (2013.01)
USPC ............................................. 68/23.1; 68/140

(58) Field of Classification Search
USPC ................................................... 68/140, 23.1
See application file for complete search history.

(56) References Cited

U.S. PATENT DOCUMENTS

| 5,375,437 | A | * | 12/1994 | Dausch et al. | ............... | 68/12.06 |
| 5,517,898 | A | * | 5/1996 | Kim et al. | ......................... | 91/24 |
| 7,472,567 | B2 | | 1/2009 | Park et al. | | |
| 2004/0163425 | A1 | * | 8/2004 | Kim et al. | ..................... | 68/23.1 |
| 2007/0278723 | A1 | * | 12/2007 | Shoemaker et al. | .......... | 267/131 |

FOREIGN PATENT DOCUMENTS

GB      1123208      8/1968

* cited by examiner

*Primary Examiner* — Joseph L Perrin
*Assistant Examiner* — Levon J Shahinian
(74) *Attorney, Agent, or Firm* — Dority & Manning, P.A.

(57) ABSTRACT

A pneumatic variable damping device for attenuating the motion of a wash tub in a washing machine is disclosed. The pneumatic variable damping device includes a pneumatic cylinder defining a first chamber and a second chamber. The pneumatic cylinder includes a piston slidably mounted to the cylinder. The piston separates the first chamber from the second chamber. The pneumatic variable damping device includes a first valve coupled to the first chamber and a second valve coupled to the second chamber. The first valve and the second valve are configured to restrict the flow of pneumatic fluid from the respective chambers of the pneumatic cylinder. The first valve and the second valve can also be configured to allow the free flow of pneumatic fluid from the respective chambers of the pneumatic cylinder.

18 Claims, 4 Drawing Sheets

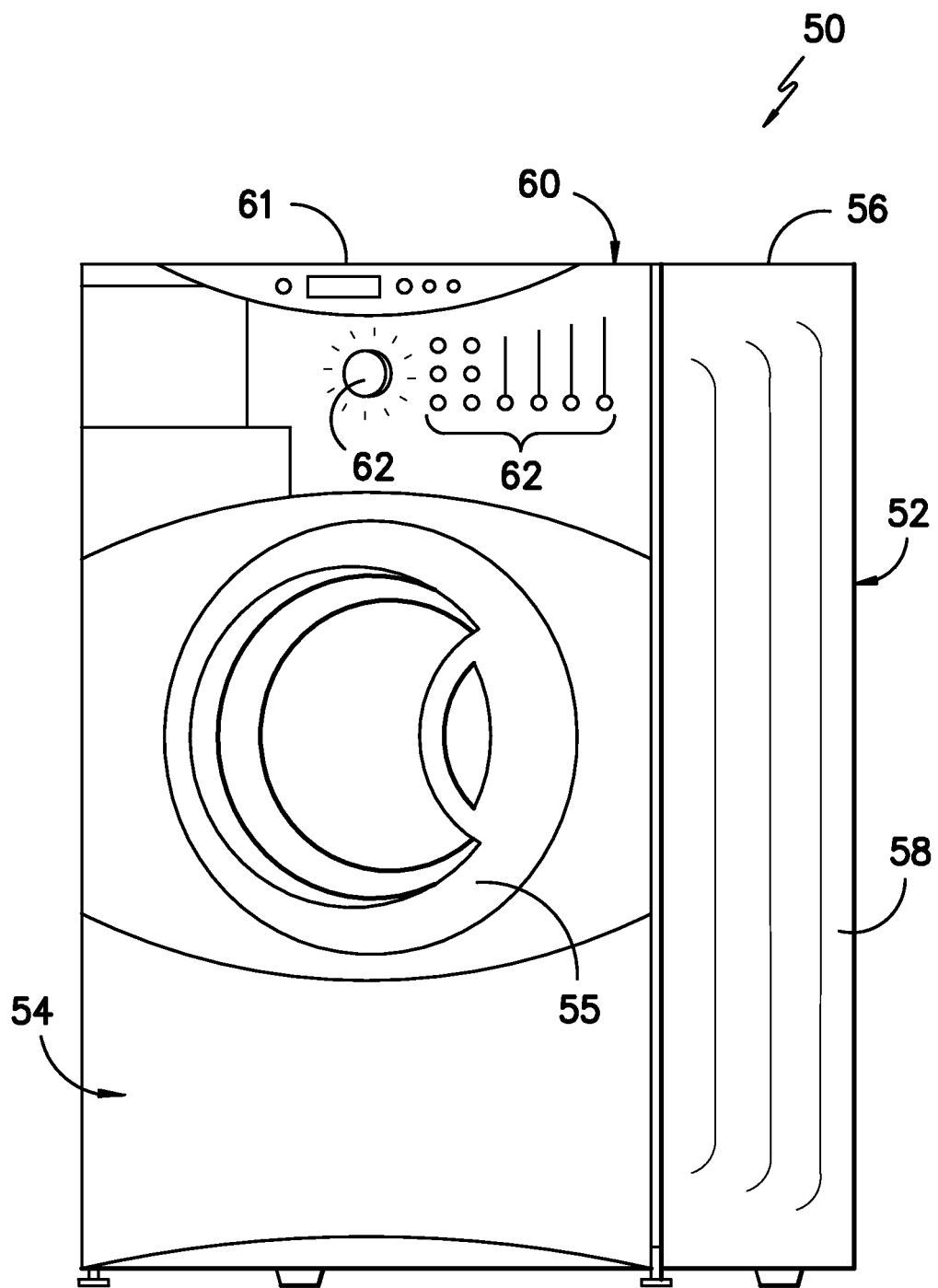
FIG. -1-

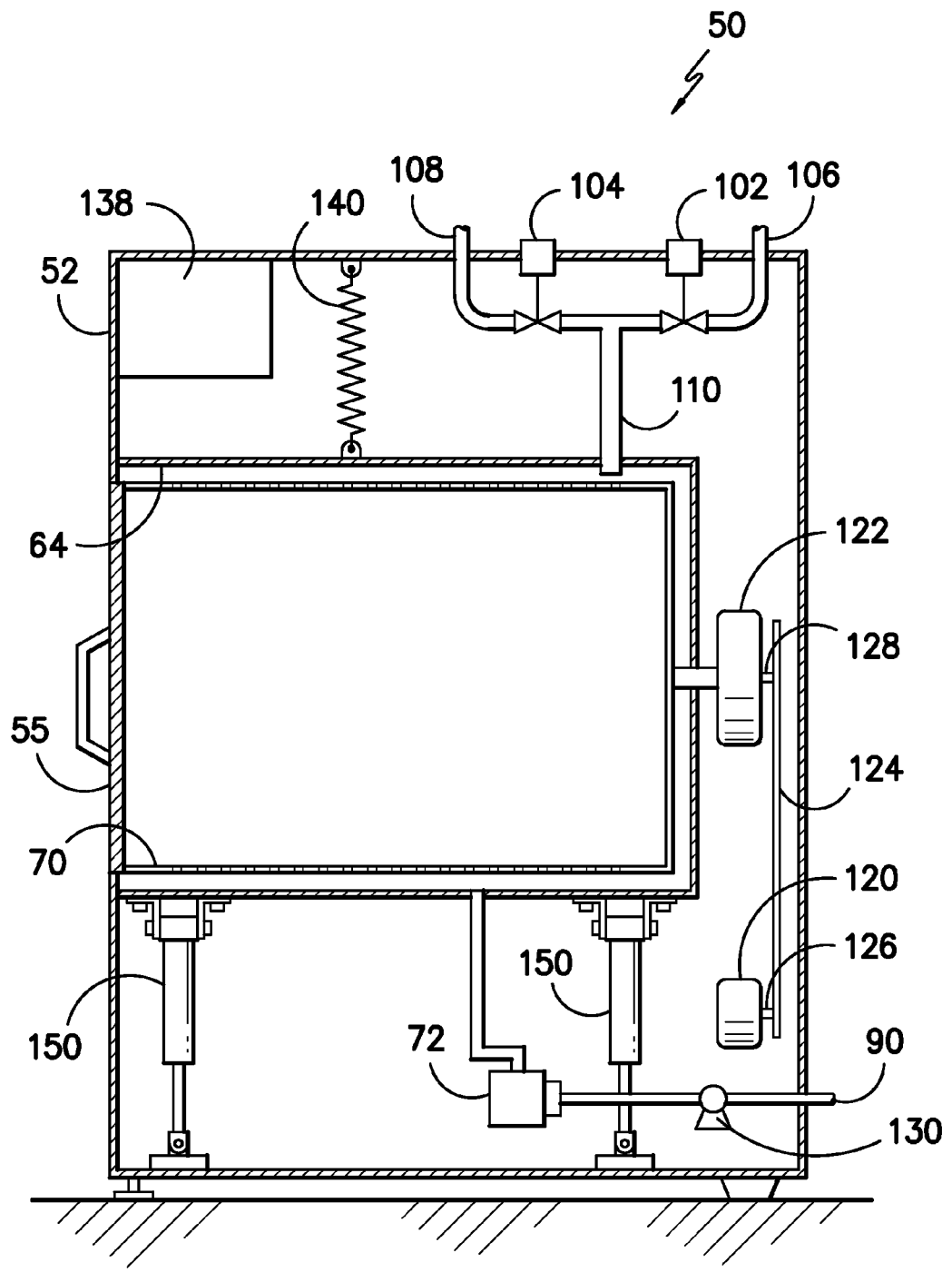
FIG. -2-

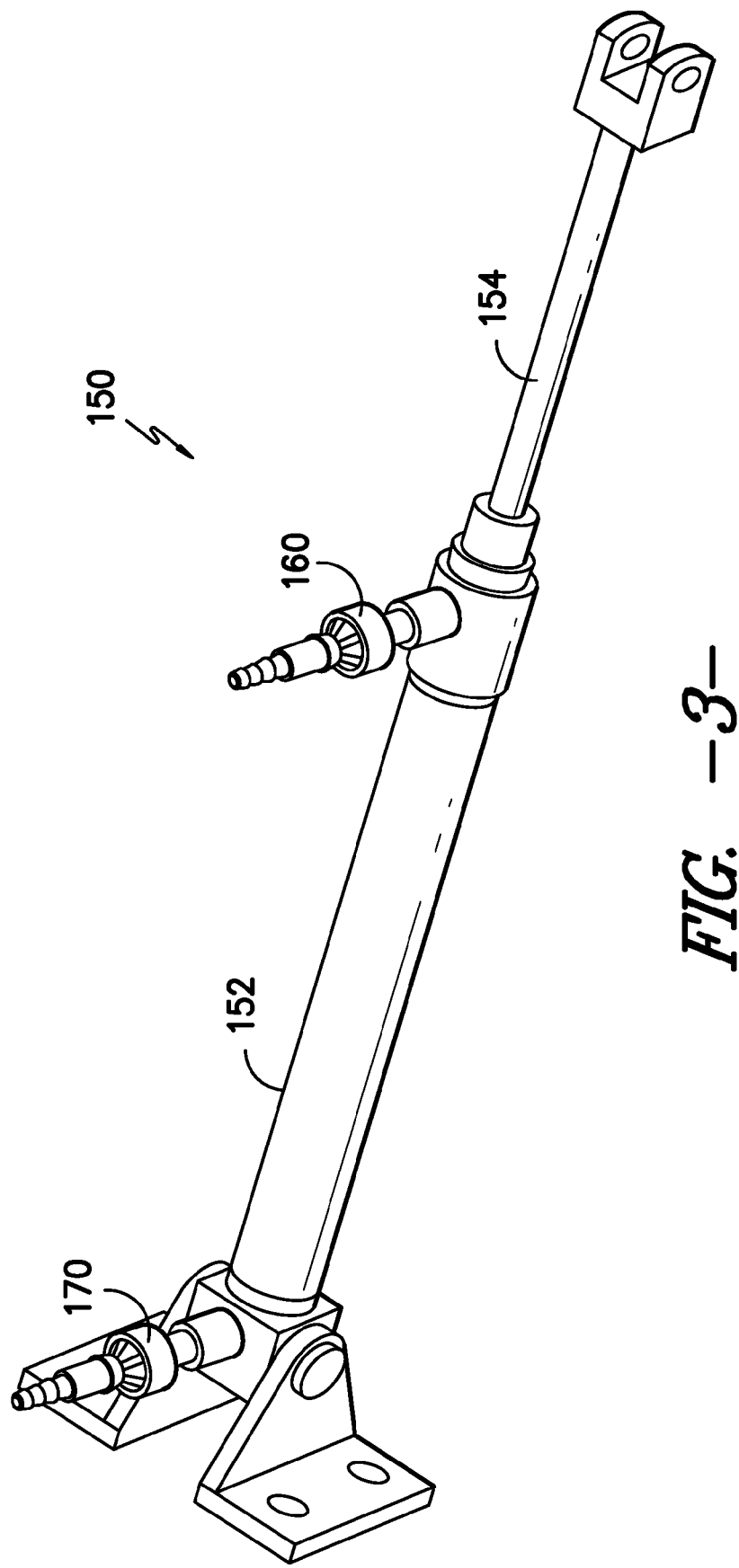
FIG. -3-

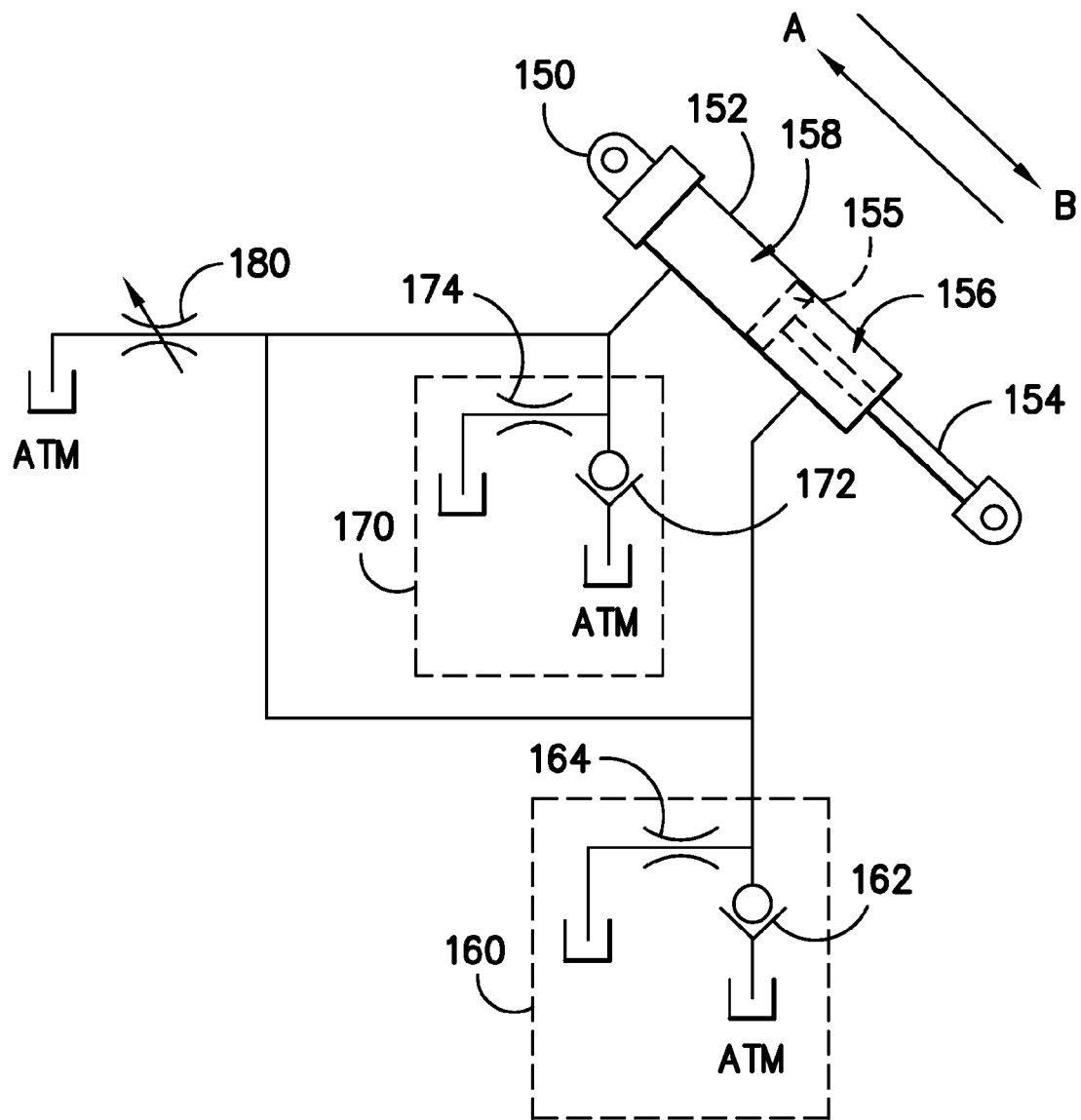
FIG. -4-

PNEUMATIC VARIABLE DAMPING DEVICE FOR WASHING MACHINES

FIELD OF THE INVENTION

The present disclosure relates generally to washing machines, and more particularly to a pneumatic variable damping device for washing machines.

BACKGROUND OF THE INVENTION

Washing machines typically include a cabinet which receives a stationary tub for containing wash and rinse water. A wash basket is rotatably mounted within the wash tub. A drive assembly and a brake assembly can be positioned with respect to the wash tub and configured to rotate and control the rotation of the wash basket within the wash tub to cleanse the wash load loaded into the wash basket. Upon completion of a wash cycle, a pump assembly can be used to rinse and drain the soiled water to a draining system.

Washing machines include vertical axis washing machines and horizontal axis washing machines, where "vertical axis" and "horizontal axis" refer to the axis of rotation of a wash basket in the washing machine. Horizontal axis washing machines typically have the wash tub suspended in the cabinet by simple spring assemblies and damped from below using various damping devices. Horizontal axis washers exhibit many vibration harmonics and work in a wide range of rotational speeds. Vibration in horizontal axis washers has been addressed through use of external feedback, such as through use of variable speeds based on accelerometer feedback or by motor feedback to control rebalance. Vibration has also been addressed through use of fixed friction damping devices, tuned to one condition. Fixed friction type damping devices, however, cannot accommodate the infinite range of mass, imbalance, and rotational speed seen in horizontal axis washing machines.

Thus a need exists for a damping device with self-regulating damping characteristics that will adapt to the needs of the washing machine without external feedback within the washing machine from other devices. A damping device that will provide an increased damping ratio when the amplitude of displacement is increased and that will provide reduced damping at low displacements would be particularly useful.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a pneumatic variable damping device for use in a washing machine. The damping device includes a sealed cylinder having a first chamber and a second chamber. The damping device includes a piston slidably mounted in the cylinder. The piston separates the first chamber from the second chamber. The damping device further includes a first valve in fluid communication with the first chamber. The first valve restricts the flow of pneumatic fluid from the first chamber. The damping device further includes a second valve in fluid communication with the second chamber. The second valve restricts the flow of pneumatic fluid from the second chamber.

Another exemplary embodiment of the present disclosure is directed to a washing machine. The washing machine includes a cabinet defining a base, a wash tub and a wash basket rotatably mounted in the wash tub. The washing machine further includes at least one pneumatic variable damping device. The at least one damping device includes a cylinder coupled to the wash tub. The cylinder has a first chamber and a second chamber. The at least one damping device further includes a piston slidably mounted in the cylinder. The piston separates the first chamber from the second chamber. The piston is coupled to the base of the cabinet. The at least one damping device includes a first valve in fluid communication with the first chamber. The first valve restricts the flow of pneumatic fluid from the first chamber. The at least one damping device further includes a second valve in fluid communication with the second chamber. The second valve restricts the flow of pneumatic fluid from the second chamber.

Variations and modifications can be made to these exemplary embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. -1- is a perspective view of a washing machine according to an exemplary embodiment of the present disclosure;

FIG. -2- is a side elevation schematic view of the washing machine of FIG. -1-;

FIG. -3- is a perspective view of a pneumatic variable damping device according to an exemplary embodiment of the present disclosure; and FIG. -4- provides is a schematic of an exemplary pneumatic system that includes a pneumatic variable damping device according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a pneumatic variable damping device for attenuating motion of a wash tub in a washing machine, such as a horizontal axis washing machine. The damping device includes a sealed pneumatic cylinder having a first chamber and a second chamber. The damping device further includes a piston slidably mounted in the cylinder. The piston separates the first chamber from the second chamber. The damping device further includes a first valve coupled to the first chamber and a second valve coupled to the second chamber. The first valve and the second valve are unidirectional valves that each allow the flow of pneumatic fluid, such as air, into the respective chambers of the cylinder, but restrict the flow of pneumatic fluid from the respective chambers of the cylinder.

The pneumatic variable damping device according to exemplary embodiments of the present disclosure adapts to the needs of the washing machine without external feedback within the machine from other devices. In particular, the first and second valves allow the damping ratio of the damping device to be increased when the amplitude of displacement of the piston is increased and similarly allow the damping ratio of the damping device to be decreased when the amplitude of displacement of the piston is decreased. In particular, because the unidirectional valves restrict the flow of pneumatic fluid from the respective cylinder chambers, greater damping force is applied to the piston as the amplitude of vibration of the piston increases. Similarly, reduced damping force is applied to the piston as the amplitude of vibration of the piston decreases. In this manner, the present disclosure provides for a pneumatic variable damping device that can accommodate the infinite range of mass, imbalance, and rotational speeds exhibited by washing machines, such as horizontal axis washing machines.

FIG. -1- provides a perspective view of an exemplary washing machine 50 according to an exemplary embodiment of the present disclosure. Washing machine 50 includes a cabinet 52 having a front panel 54, a top panel 56, and side panels 58. A door 55 is mounted to front panel 54 and is rotatable about a hinge (not shown) between an open position (not shown) facilitating access to a basket (not shown) in the interior of washing machine 50 that holds a wash load, and a closed position (as shown in FIG. -1-) forming a substantially sealed enclosure over the basket. A control panel 60 including a plurality of input selectors 62 is coupled to an upper portion of front panel 54. Control panel 60 and input selectors 62 collectively form a user interface for operator selection of machine cycles and features, and, in one embodiment, a display section 61 indicates selected features, machine status, and other items of interest to users.

As illustrated in FIG. -1-, washing machine 50 is a horizontal axis machine. It is contemplated that the present disclosure is applicable, not only to horizontal axis machines, such as washing machine 50, but to other forms of clothes treatment machines, such as vertical axis machines. It is also contemplated that the benefits of the present disclosure accrue to other forms of clothes treatment machines, such as for example, washing/dry cleaning machines, dry cleaning machines, and washer/dryer combination machines. Therefore, washing machine 50 is provided by way of illustration rather than limitation. Accordingly, the following description is for illustrative purposes only, and there is no intention to limit application of the present invention to any clothes treatment machine, such as horizontal axis washing machine 50.

FIG. 2 is a side elevational schematic view of washing machine 50 including wash basket 70 movably disposed and rotatably mounted in wash tub 64 in a spaced apart relationship from the tub side walls. Basket 70 includes a plurality of perforations therein to facilitate fluid communication between an interior of basket 70 and wash tub 64.

A hot liquid valve 102 and a cold liquid valve 104 deliver wash fluid, such as water, to basket 70 and wash tub 64 through a respective hot liquid hose 106 and a cold liquid hose 108. Liquid valves 102, 104 and liquid hoses 106, 108 together form a liquid supply connection for washing machine 50 and, when connected to a building plumbing system (not shown), provide a fresh water supply for use in washing machine 50. Liquid valves 102, 104 and liquid hoses 106, 108 are connected to a basket inlet tube 110, and fluid is dispersed from inlet tube 110 into tub 64.

Basket 70 is driven by motor 120 through a transmission and clutch system 122. A transmission belt 124 is coupled to respective pulleys of a motor output shaft 126 and a transmission input shaft 128. Thus, as motor output shaft 126 is rotated, transmission input shaft 128 is also rotated. Clutch system 122 facilitates driving engagement of basket 70 for rotatable movement within wash tub 64, and clutch system 122 facilitates relative rotation of basket 70 for selected portions of wash cycles. Motor 120, the transmission and clutch system 122 and belt 124 collectively are referred herein as a machine drive system.

Washing machine 50 also includes a brake assembly (not shown) selectively applied or released for respectively maintaining basket 70 in a stationary position within tub 64 or for allowing basket 70 to spin within tub 64. Pump assembly 72 is selectively activated, in the example embodiment, to remove liquid from basket 70 and tub 64 through drain outlet 90 and a drain valve 130 during appropriate points in washing cycles as washing machine 50 is used.

Operation of machine 50 is controlled by a controller 138 which is operatively coupled to the user interface input located on washing machine control panel 60 (shown in FIG. -1-) for user manipulation to select washing machine cycles and features. In response to user manipulation of the user interface input, controller 138 operates the various components of machine 50 to execute selected machine cycles and features.

Tub 64 is suspended in the washing machine cabinet 52 by spring assemblies 140 (only one spring assembly 140 is illustrated in FIG. -2-) and damped from below using pneumatic damping devices 150. During operation, tub 64 exhibits an infinite range of vibrations, mass, imbalance, and rotational speed. Damping devices 150 are used to damp and provide stability to tub 64 during operation. As will be discussed in more detail below, pneumatic damping devices 150 provide variable damping for tub 64 to accommodate the wide range of vibrations, mass, imbalance, and rotational speeds exhibited by tub 64 during operation.

FIG. -3- provides a close-up perspective view of an exemplary damping device 150 according to an exemplary embodiment of the present disclosure. As illustrated, damping device 150 includes a sealed cylinder 152 and a piston 154 that is slidably movable within cylinder 152. In a particular embodiment, cylinder 152 can be attached or coupled to tub 64 and piston 154 can be attached or coupled to the cabinet 52 of washing machine 50 (shown in FIG. -2-). Alternatively, cylinder 152 can be attached or coupled to cabinet 52 of washing machine and piston 154 can be coupled or attached to tub 64. As tub 64 rotates and vibrates during operation, piston 154 oscillates within cylinder 152.

Pneumatic variable damping device 150 includes a first valve 160 and a second valve 170. First valve 160 and second valve 170 are unidirectional valves that allow pneumatic fluid, such as air, to flow into cylinder 152, but restrict the flow of pneumatic fluid from cylinder 152. For instance, in a particular embodiment, first valve 160 includes a check valve that allows the flow of pneumatic fluid in a first direction into cylinder 152 and an orifice bleed valve that restricts the flow of pneumatic fluid in a second direction (opposite the first direction) from the cylinder 152. Similarly, second valve can include a check valve that allows the flow of pneumatic fluid in a first direction into cylinder 152 and an orifice bleed valve that restricts the flow of pneumatic fluid in a second direction (opposite the first direction) from the cylinder 152.

The use of unidirectional first valve 160 and unidirectional second valve 170 provides variable damping of a wash tub 64 (shown in FIG. -2-) of washing machine 50 (shown in FIG. -2-). The variable damping provided by pneumatic damping device 150 will be discussed in more detail with reference to FIG. 4.

FIG. -4- illustrates a schematic of a pneumatic system incorporating pneumatic damping device 150. As illustrated, pneumatic damping device 150 includes cylinder 152 and piston 154. Piston 154 is slidably movable within cylinder 152 and includes an end portion 155 that separates cylinder 152 into a first chamber 156 and a second chamber 158. First valve 160 is coupled to first chamber 156. Second valve 170 is coupled to second chamber 158

As illustrated in FIG. -4-, first valve 160 can be modeled as or can include a check valve 162 and a flow control valve, such as a bleed orifice valve 164. Similarly, second valve 170 can be modeled as or can include a check valve 172 and a flow control valve, such as bleed orifice valve 174. As vibrations or other forces cause piston 154 to move in a first direction A inside cylinder 152, first chamber 156 expands, drawing pneumatic fluid through check valve 162 into first chamber 156. As first chamber 156 expands, second chamber 158 contracts forcing pneumatic fluid from second chamber 158 through bleed orifice valve 174. However, because bleed orifice valve 174 restricts flow of pneumatic fluid from second chamber 158, increased pressure is applied against the movement of piston 154 in first direction A as piston 154 moves further within cylinder 152.

Due to vibration and other forces, piston 154 will eventually move in a second direction B within cylinder 152. As piston 154 moves in second direction B, second chamber 158 expands, drawing pneumatic fluid drawing pneumatic fluid through check valve 172 into second chamber 158. As second chamber 158 expands, first chamber 156 contracts forcing pneumatic fluid from first chamber 156 through bleed orifice valve 164. However, because bleed orifice valve 164 restricts flow of pneumatic fluid from first chamber 156, increased pressure is applied against the movement of piston 154 in second direction B as piston 154 moves further within cylinder 152.

In this manner, pneumatic damping device 150 provides an increased damping ratio as the amplitude of vibration of piston 154 increases. Similarly, pneumatic damping device 150 provides a reduced damping ratio as the amplitude of vibration of piston 154 decreases. Accordingly, the pneumatic variable damping device 150 can provide self-regulating damping characteristics that will adapt to the needs of the washing machine without external feedback within the washing machine from other devices.

As illustrated in FIG. -4-, first chamber 156 and second chamber 158 of cylinder 152 can be coupled to a pressure control valve 180. Pressure control valve 180 can provide relief for a build up of pressure in first chamber 156 and second chamber 158 that can cause damage to pneumatic damping device 150. In particular, pressure control valve 180 can be configured such that when pressure in first chamber 156 or second chamber 158 exceeds a threshold value, pressure control valve 180 allows release of pneumatic fluid from first chamber 156 or second chamber 158 to relieve the pressure build up, avoiding damage to damping device 150.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance, comprising:
   a cabinet;
   a wash tub supported in said cabinet;
   a wash basket rotatably mounted in said wash tub; and
   a pneumatic variable damping device extending between the wash tub and the cabinet in order to couple the wash tub to the cabinet, the pneumatic variable damping device comprising
      a sealed cylinder comprising a first chamber and a second chamber;
      a piston slidably mounted in said cylinder, said piston separating said first chamber from said second chamber;
      a first valve in fluid communication with said first chamber, said first valve permitting free flow of pneumatic fluid into said first chamber and permitting restricted flow of pneumatic fluid from said first chamber, said first valve being the only inlet and outlet through said sealed cylinder for pneumatic fluid within said first chamber; and
      a second valve in fluid communication with said second chamber, said second valve permitting free flow of pneumatic fluid into said second chamber and permitting restricted flow of pneumatic fluid from said second chamber, said second valve being the only inlet and outlet through said sealed cylinder for pneumatic fluid within said second chamber;
   wherein said first valve permits free flow of pneumatic fluid into said first chamber and said second valve permits restricted flow of pneumatic fluid out of said second chamber whenever said piston moves in a first direction within said cylinder;
   wherein said second valve permits free flow of pneumatic fluid into said second chamber and said first valve permits restricted flow of pneumatic fluid out of said first chamber whenever said piston moves in a second direction within said cylinder, the second direction being opposite the first direction; and
   wherein pneumatic fluid flowing through the first and second valves increases a damping ratio of the pneumatic variable damping device when an amplitude of displacement of the piston increases and decreases the damping ratio of the pneumatic variable damping device when the amplitude of displacement of the piston decreases.

2. The washing machine appliance of claim 1, wherein said first valve and said second valve operate as a check valve in a first flow direction.

3. The washing machine appliance of claim 2, wherein said first valve and said second valve operate as an orificed flow control valve in a second flow direction, the second flow direction being opposite the first flow direction.

4. The washing machine appliance of claim 1, wherein the pneumatic fluid comprises air.

5. The washing machine appliance of claim 1, wherein said first chamber and said second chamber are coupled to a pressure control valve.

6. The washing machine appliance of claim 1, wherein said cylinder is coupled to said wash tub.

7. The washing machine appliance of claim 1, wherein said piston is coupled to said cabinet.

8. The washing machine appliance of claim 1, wherein the wash basket is mounted for rotating about a substantially horizontal axis.

9. The washing machine appliance of claim 1, further comprising a spring assembly extending between the cabinet and the wash tub in order to suspend the wash tub within the cabinet.

10. The washing machine appliance of claim 9, wherein the spring assembly is coupled to the wash tub at a top portion of the wash tub and the pneumatic variable damping device is coupled to the wash tub at a bottom portion of the wash tub.

11. A washing machine, comprising:
- a cabinet;
- a wash tub supported in said cabinet;
- a wash basket rotatably mounted in said wash tub; and
- at least one pneumatic variable damping device, the pneumatic variable damping device comprising:
  - a cylinder coupled to said wash tub, said cylinder having a first chamber and a second chamber;
  - a piston slidably mounted in said cylinder, said piston separating said first chamber from said second chamber, said piston coupled to said cabinet;
  - a first valve in fluid communication with said first chamber, said first valve permitting free flow of pneumatic fluid into said first chamber and permitting restricted flow of pneumatic fluid from said first chamber, pneumatic fluid entering and exiting said first chamber through said sealed cylinder only via said first valve; and
  - a second valve in fluid communication with said second chamber, said second valve permitting free flow of pneumatic fluid into said second chamber and permitting restricted flow of pneumatic fluid from said second chamber, pneumatic fluid entering and exiting said second chamber through said sealed cylinder only via said second valve,
  - wherein said first valve permits free flow of pneumatic fluid into said first chamber and said second valve permits restricted flow of pneumatic fluid out of said second chamber during all motion of said piston in a first direction within said cylinder;
  - wherein said second valve permits free flow of pneumatic fluid into said second chamber and said first valve permits restricted flow of pneumatic fluid out of said first chamber during all motion of said piston in a second direction within said cylinder, the second direction being opposite the first direction; and
  - wherein pneumatic fluid flowing through the first and second valves increases a damping ratio of the pneumatic variable damping device when an amplitude of displacement of the piston increases and decreases the damping ratio of the pneumatic variable damping device when the amplitude of displacement of the piston decreases.

12. The washing machine of claim 11, wherein said first valve and said second valve operate as a check valve in a first flow direction.

13. The washing machine of claim 12, wherein said first valve and said second valve operate as an orifice flow control valve in a second flow direction, the second flow direction being opposite the first flow direction.

14. The washing machine of claim 11, wherein the pneumatic fluid comprises air.

15. The washing machine of claim 11, wherein said first chamber and said second chamber are coupled to a pressure control valve.

16. The washing machine of claim 11, wherein the wash basket is mounted for rotating about a substantially horizontal axis.

17. The washing machine of claim 11, further comprising a spring assembly extending between the cabinet and the wash tub in order to suspend the wash tub within the cabinet.

18. The washing machine of claim 17, wherein the spring assembly is coupled to the wash tub at a top portion of the wash tub and the cylinder is coupled to the wash tub at a bottom portion of the wash tub.

* * * * *